Patented June 24, 1952

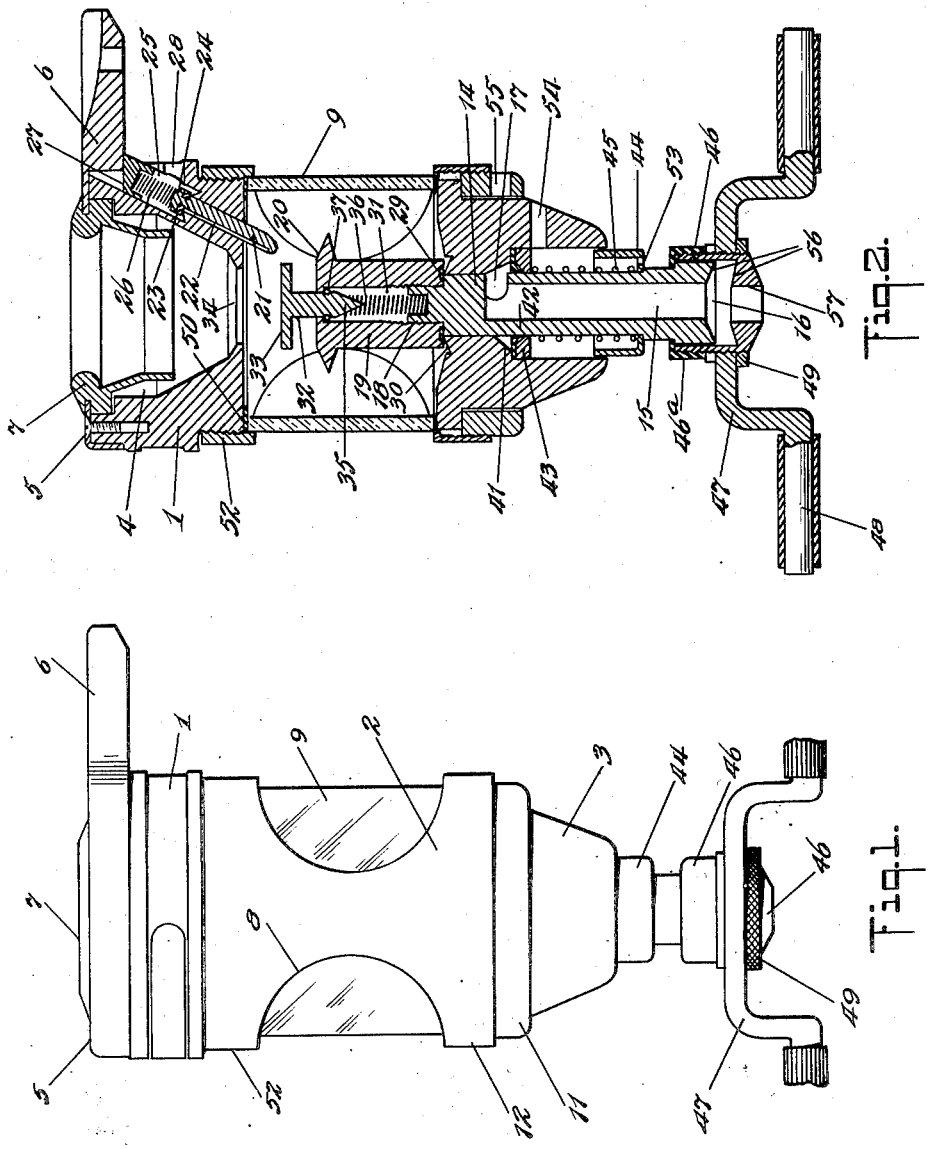

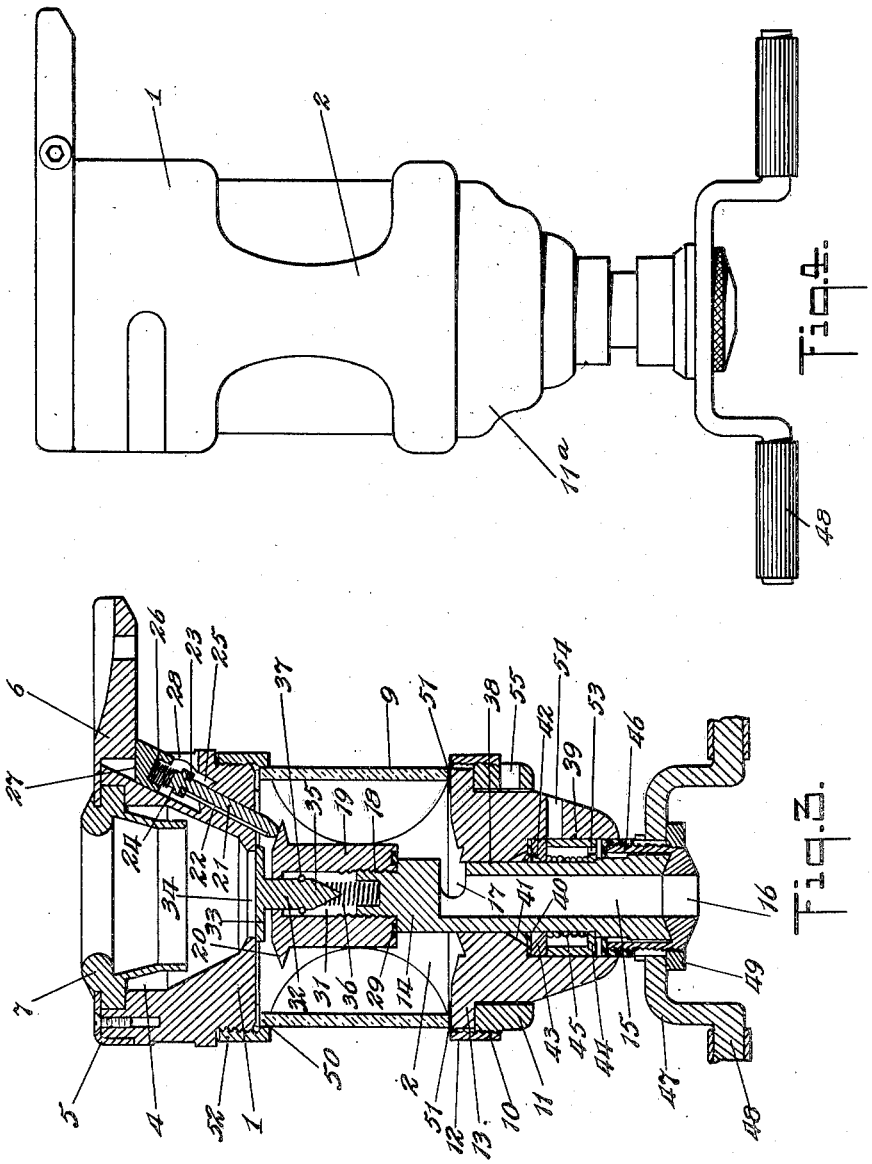

2,601,359

UNITED STATES PATENT OFFICE 2,601,359

TAKEDOWN LIQUID MEASURING DISPENSER HAVING RESILIENTLY CONNECTED INLET AND OUTLET VALVES

Albert George Berwick, Streatham, London, England, assignor, by mesne assignments, to Gaskell & Chambers Limited, Birmingham, England, a corporation of Great Britain Application July 2, 1946, Serial No. 681,024

5 Claims. (Cl. 222—446)

1

This invention relates to devices for delivering measured quantities of liquid and has particular reference to such a device adapted to be detachably connected to an inverted bottle or other container and having a measuring chamber with liquid inlet and outlet means as well as an air inlet, all controlled by the axial movement of a single operating element actuated by upward movement, relative to the device, of the receptacle into which the measured quantity of liquid is to be delivered.

While prior devices of the kind above indicated operate satisfactorily insofar as they will deliver an exact measured quantity of liquid at each operation, experience in their operation has rendered desirable certain improvements in their design and construction, and the object of the present invention is to provide an improved device of the kind indicated, wherein the construction is simplified so that it can be readily dismantled for cleaning purposes and reassembled by a mechanically unskilled person, and which lends itself to manufacture from moulded plastic material. Extensive use of such material, owing to its relative brittleness as compared with metal, has not been practicable in prior devices of this type, but such material possesses the advantages that it is inert to the action of certain liquids and provides a very light weight measuring device as compared with such a device made throughout in metal.

According to the invention, a device for delivering measured quantities of liquid comprises a housing formed at its upper end to engage the mouth of an inverted bottle, or other container, and having at its lower end a base wherein a valve operating member is movably mounted, characterized by a single screw-threaded member, or the like, serving to secure the entire assembly together in operative condition, and by a stop device or devices embodied in the base and arranged so that the pressure of operation is taken by the more rugged portion of the housing to protect the axially movable operating member and its associated parts from damage.

For a better understanding of the invention, reference may be had to the accompanying drawings, in which Fig. 1 is an elevational view of one form of the new device;

Fig. 2 is a vertical sectional view of the device shown in Fig. 1, with the parts in their inoperative positions;

Fig. 3 is a view similar to Fig. 2 but showing

2 the parts in their positions when a measured quantity of liquid is being delivered, and Fig. 4 is an elevational view of a modified construction.

In the construction illustrated in Figs. 1–3, the measuring device includes a housing comprising parts 1, 2 and 3 which may be moulded from a plastic material, the part 1 being formed at its upper end with a socket 4 to enable the open end of an inverted bottle to be pushed into it and fluid tight contact to be made thereby with the cooperating elements. The moulded portion 1 carries a head plate 5 having a projecting portion 6 whereby the device can be detachably fixed in a supporting stand. This head plate engages with a ring 7 of india-rubber, or like resilient material, disposed within the socket 4 and shaped to engage around the neck of a bottle.

The mid-portion 2 of the housing is cut away, as shown in Fig. 1, at two opposed sides marked 8 so as to expose the mid-portion of a transparent cylindrical wall 9 of the measuring chamber. This wall may be made in glass but it is preferably formed of a relatively thick transparent plastic material. The glass is inserted into the housing through the base of the part 2 and is held in position by means hereinafter described.

The base of the housing part 2 is screw-threaded internally at 10 and receives an external screw-thread formed on a hollow or axially bored screw 11 by which the housing assembly is held together. The base of the housing is constituted by the member 3 of substantially cylindrical form with an outwardly extending flange 13 at its upper end which constitutes the base of the measuring chamber. The cylindrical wall 9 is mounted between the parts 1 and 3 of the housing, washers 50 and 51 being interposed, respectively, between its upper and lower ends and the adjacent housing parts to ensure fluid tight seals being made. The upper and lower ends of the housing part 2 are formed as internally screw-threaded rings, the upper ring 52 making screw-threaded engagement with the housing part 1 and the lower ring 12 being engaged by the screw 11 as already described.

In the centre of the housing part 3 is a cylindrical passage forming a guide for an axially movable operating element 14. This operating element is of cylindrical form, is solid at its upper end, and has a central passage 15 extending through the major portion of its length to an outlet opening 16 at its lower end. The passage 15 terminates at its upper end in a lateral port 17 (or ports) adapted to communicate with the interior of the measuring chamber when the device is operated. The upper end of the operating member 14 extends into the measuring chamber and is externally threaded at 18 for the purpose of detachably connecting to it a head 19 which terminates at its upper end in a flange 20. When the head 19 is raised, its flange 20 is adapted to operate an air valve whose stem 21 projects into the measuring chamber through an aperture in the upper portion 1 of the housing.

The air inlet valve includes the stem 21 which is longitudinally grooved at 22 to form an air passage normally sealed at its upper end by a washer 23 carried in a head 24 on the stem. The washer 23 has a seat at the base of a valve chamber 25 and is normally held against the seat by a spring 26 which bears at its lower end on the head 24 and at its upper end against a plug 27. The plug closes the outer end of the valve chamber 25 and is maintained in that position by the portion 6 of the head plate 5. Air is admitted to the valve chamber 25 through a port 28 in the side thereof.

The outlet from the measuring chamber is sealed, when the parts are in the inoperative position shown in Fig. 2, by an annular resilient element 29 disposed in a recess in the base of the head 19 and normally seated on the edge of an inclined annular seating 30 surrounding the operating member 14 and formed in the upper surface of the housing part 3.

The head 19 has a longitudinal passage 31 in which is movably mounted the stem 32 of a valve member 33 adapted to close an inlet 34 in the top of the measuring chamber when the operating member 14 is raised. The stem 32 of the valve member 33 has a tapered lower end 35 which enters the coils of a spring 36 disposed within the head 19 and bearing at its lower end in a recess in the top of the operating member 14. The valve stem 32 is surrounded by a supporting ring 37 engaged by an internal flange on the head 19 and allowing the stem to tilt about its vertical axis so that the valve member 33 is self-aligning on the seating surrounding the inlet 34.

Below the passage 38 in the base 3, which acts as a guide for the operating member 14, the internal diameter of the base member is enlarged to form a cylindrical wall 39 spaced from the surface of the operating member. Near the upper end of the enlarged space is a sealing member 40 which is seated against a shoulder and consists of an annular disc of india-rubber or synthetic rubber. The inner edge of disc 40 is free to move slightly within an annular chamber having upwardly and downwardly diverging walls formed by chamfered surfaces 41 and 42 on the housing part 3 and on a ring 43 respectively, the ring 43 being fixed within the wall 39 of the enlarged space immediately below the annular disc 40. The inner portion of disc 40 is thus free to flex upwards and downwards with the movement of the operating member 14. The dimensions of the disc 40 are such that its inner portion is normally bent out of the horizontal plane, so that one of the corners at its inner edge makes line contact with the outer surface of part of the operating member 14. This line contact is maintained, as the operating member 14 is moved, to form a liquid seal operative against leakage in all positions of the operating member. The position of the disc 40 is arranged so that it always lies below the lateral port 17 in the operating member.

At a point below the sealing member 40, the operating member 14 carries a short sleeve 44 which is movable in and guided by the wall 39. Seated in the sleeve 44 is the base of a spring 45 whose upper end bears against the ring 43. The spring 45 is compressed by upward movement of the operating member 14, which is restored to normal position after operation by expansion of the spring 45.

To prevent the formation of an air cushion when the device is operated, the sleeve 44 is formed with an aperture 53 in its base, and the wall 39 is provided with a port 54. Both aperture 53 and port 54 allow air to escape from within sleeve 44 when it is pushed upwards.

Of the components above described, the housing 1—2—3, the operating member 14, its head 19, the ring 43 and sleeve 44 are made as moulded plastic units, but in some constructions where strength is of importance the housing part 2 is of metal.

The base of the operating member 14 terminates in a drip catching device which, for purposes of strength and convenience in assembly, is provided with a metal cup-shaped casing 46 which supports laterally extending arms 47, also made of metal. The operating pressure is applied to the device by the rim of the receptacle to be charged being brought to bear upon the ends 48 of the arms, the receptacle then being moved upwardly to raise the operating member 14. The casing 46 is slidable on the operating member 14 and is normally supported by a collar 46a threaded on the casing and having an inwardly extending flange resting on an external shoulder on member 14. In this position of the casing, its bottom wall is spaced from the lower end of member 14, the bottom wall and the adjacent end of member 14 sloping downwardly and outwardly, as shown at 56. The arms 47 are clamped against collar 46a by a nut 49 screwed on the casing.

In the operation of the device above described, vertical axial movement of the operating member 14 moves the assembly constituted by the head 19 and valve member 33 upwards against spring 45, so that the valve member 33 first closes the inlet 34. Continued upward movement causes the head 19 to move upwards relative to the stem 32, thereby compressing spring 36 until the flange 20 engages and operates the air valve stem 21 to unseat the washer 23 and place the interior of the measuring chamber in communication with the atmosphere. By this time, the port 17 has entered the measuring chamber so that atmospheric pressure causes expulsion of the measured charge of liquid through the passage 15 by gravity. The parts are then in the positions shown in Fig. 3.

In order to prevent undue strain being placed on the more fragile parts of the device, such as the operating member 14, the valve member 33 and the head 19, the sleeve 44 comes into contact with the ring 43 before the upper surface of the head 20 can make contact with the valve member 33. Thus the operating pressure is transmitted through the ring 43 to the base member 3, so that strain is largely removed from the operating member 14 and any tendency to fracture across the ported portion 17 is avoided.

When the receptacle to be charged is withdrawn from the arms 47 to release operating member 14, the spring 45 returns member 14 to its normal lowered position, so that air valve 23 is closed. At the same time, the spring 36 moves valve 33 upward in head 19 until the ring 37 engages the overlying flange on the head, whereupon the valve 33 is unseated to allow a new liquid charge to enter the measuring chamber through inlet 34. Upon release of the arms 47 by the receptacle, the casing 46 drops to its lower position on member 14, thereby providing a space for catching and retaining any liquid which may continue to descend along the wall of passage 15. When the arms 47 are again engaged and raised by a receptacle, the upward movement of casing 46 on member 14 expels such liquid from between the surfaces 56, the liquid then passing through the bottom opening 57 in the casing in advance of the new charge.

When the device requires cleaning, the screw 11 is slackened by hand or by the use of a simple tool provided for the purpose, this operation allowing the base 3, the operating member 14 and the parts carried thereby to be entirely removed. The tool may consist of a C-shaped spanner having a tooth which engages a slot 55 in the nut 11. For ordinary cleaning purposes, it is not necessary to dismantle the operating member 14, but this action can be simply effected by unscrewing the head 19 and by slackening the ring or nut 49 which secures the drip catching device to the base of the operating member 14.

In the modified construction shown in Fig. 4, the housing parts 1 and 2 are formed in one piece as a plastic moulding and the components are held together in the assembled condition by a nut 11a operating in a manner similar to the nut 11 in Figs. 1-3. Otherwise the arrangement and mode of operation are similar to those already described with reference to Figs. 1-3.

It is to be understood that the particular form of connection to a bottle, as illustrated in the drawings, is shown by way of example only. This connection may be varied to one which engages the interior of the bottle neck or to one capable of attachment to liquid containers other than bottles.

I claim:

1. A device for delivering measured quantities of liquid, comprising a housing formed at its upper end to engage the mouth of an inverted bottle or other container and having at its lower end a removable base, the housing defining a measuring chamber, a valve operating member movably mounted in the base for axial movement in said chamber, an air inlet valve for admitting air to the chamber, an air inlet valve operating element on said member and engageable with said valve to open the valve, the housing having an inlet to the chamber for admitting liquid thereto from the upper end of the housing, a liquid valve mounted on said member and operable thereby to close said inlet, the liquid valve being movable relative to said member to permit continued movement of the member to a non-yielding position on the liquid valve after said inlet is closed, a releasable member for securing the base to the remainder of the housing in operative condition, said base having an axial aperture formed by a guide passage leading into a cylindrical bore of greater diameter than the passage by a connecting surface incorporating an axially presenting shoulder, a ring abutting said shoulder and forming a stop within the bore, said member slidably guided in said passage and extending through said bore transversely of said stop, said member mounting an axially elongated element slidably guided in the cylindrical bore in alignment axially with said stop and of such axial length as to abut said stop with axial movement of the member before said liquid valve attains a non-yielding position relative to said member so that pressure of operation of the valve operating member is taken by the base to protect the valve operating member and its associated parts from damage.

2. A device as defined in claim 1, comprising also a transparent cylindrical wall partially surrounded by the housing and forming therewith the measuring chamber, the base of said housing being held in position against the lower edge of the transparent wall by said releasable member.

3. A device as defined in claim 1, wherein the axially elongated element comprises a flanged sleeve carried by the valve operating member and disposed in the bore in said base, the sleeve being normally spaced from the stop and engageable therewith, after said inlet to the measuring chamber has been closed and said air valve has been opened but before the valve operating member can reach said non-yielding position on the liquid valve, for the purpose of relieving the operating member of strain.

4. A device as defined in claim 1, wherein the housing includes a head portion arranged to receive and to make a fluid tight joint around the mouth of an inverted bottle, a mid-portion screw-threaded onto the head portion, and said base, the base providing the bottom of the measuring chamber and being secured to the mid-portion by said releasable member engaging within the lower edge of said mid-portion and also engaging beneath a shoulder on the base.

5. A device as claimed in claim 1, wherein the axially elongated element comprises a cylinder having a generally perpendicular terminal flange, a spring surrounding said member and confined between the stop and said flange to bias the member axially in the aperture toward opening of said liquid valve.

ALBERT GEORGE BERWICK.

REFERENCES CITED

The following references are of record in the file of this patent:

UNITED STATES PATENTS

| Number | Name | Date |
|---|---|---|
| 140,006 | Brown | June 17, 1873 |
| 1,033,149 | Bray | July 23, 1912 |
| 2,093,365 | Ransom et al. | Sept. 14, 1937 |
| 2,337,276 | Sanches | Dec. 21, 1943 |

FOREIGN PATENTS

| Number | Country | Date |
|---|---|---|
| 116,410 | Australia | Jan. 11, 1943 |